(12) United States Patent
Tonder et al.

(10) Patent No.: US 12,269,776 B2
(45) Date of Patent: *Apr. 8, 2025

(54) PERMEABLE, POURABLE CONCRETE FORMULAS AND METHODS OF USE

(71) Applicant: Pacific Interlock Pavers, Inc., Hollister, CA (US)

(72) Inventors: Dean R. Tonder, Hollister, CA (US); Tim Donovan, Gilroy, CA (US)

(73) Assignee: Pacific Interlock Pavers, Inc., Hollister, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 17/644,978

(22) Filed: Dec. 17, 2021

(65) Prior Publication Data

US 2023/0192550 A1   Jun. 22, 2023

(51) Int. Cl.
| | |
|---|---|
| C04B 28/00 | (2006.01) |
| C04B 14/06 | (2006.01) |
| C04B 14/28 | (2006.01) |
| C04B 18/14 | (2006.01) |
| C04B 28/04 | (2006.01) |
| C04B 103/22 | (2006.01) |

(52) U.S. Cl.
CPC .............. *C04B 28/04* (2013.01); *C04B 14/06* (2013.01); *C04B 14/28* (2013.01); *C04B 18/141* (2013.01); *C04B 2103/22* (2013.01); *C04B 2201/50* (2013.01)

(58) Field of Classification Search
CPC ......... C04B 28/04; C04B 14/06; C04B 14/28; C04B 18/141; C04B 2103/22; C04B 2201/50; C04B 2111/00284; E01C 5/065; E01C 7/142; E01C 11/226; Y02W 30/91
See application file for complete search history.

(56) References Cited

U.S. PATENT DOCUMENTS

| | | | | |
|---|---|---|---|---|
| 7,927,037 | B2 * | 4/2011 | Tonder ............... | E01C 11/225 |
| | | | | 106/819 |
| 8,684,626 | B2 * | 4/2014 | Tonder ............... | E01C 11/225 |
| | | | | 423/419.1 |
| 8,894,319 | B1 * | 11/2014 | Tonder ............... | C04B 28/04 |
| | | | | 52/596 |

* cited by examiner

*Primary Examiner* — Stefanie J Cohen
(74) *Attorney, Agent, or Firm* — Ray K. Shahani, Esq.

(57) ABSTRACT

A permeable, pourable concrete that has water permeability of on average about 1 inch per hour and compressive strength of an average of about 3000 psi, the permeable concrete comprising a mixture comprising blast-furnace slag, sand, gravel and Portland-type or equivalent cement, the concrete mixed with a predetermined ratio of water, poured into a predetermined form as desired, and set to harden until sufficiently strong.

3 Claims, 2 Drawing Sheets

PERMEABLE, POURABLE CONCRETE FORMULAS AND METHODS OF USE

RELATED APPLICATION(S)

None

FIELD OF THE INVENTION

This invention relates to permeable, pourable concrete formulas and methods of use, and more particularly to porous, pourable concrete formulated using recycled materials and other green technologies that allow water moisture to permeate and drain therethrough.

BACKGROUND OF THE INVENTION

This Application is related to U.S. Pat. No. 7,927,037 issued Apr. 19, 2011 and U.S. Pat. No. 8,684,626 issued Apr. 1, 2014, both entitled "PERMEABLE PAVER AND MANUFACTURING METHOD THEREFOR". This Application is also related to PCT Patent Application No. PCT/US10/43415 filed Jul. 27, 2010 entitled "PERMEABLE PAVER AND MANUFACTURING METHOD THEREFOR". These patents teach a permeable paver formed using a hydraulic-type block forming machine using both conventional cementitious materials as well as SCMs formed by mineralization of CO2.

This Application is also related to U.S. Pat. No. 8,894,319 issued Nov. 25, 2014 entitled "PERMEABLE PAVING SLAB AND PAVER AND MANUFACTURING METHOD THEREFOR". This patent teaches a permeable paving slab formed using a hydraulic-type block forming machine using both conventional cementitious materials as well as SCMs formed by mineralization of CO2.

Slag has many commercial uses, and is rarely discarded. It is often reprocessed to separate any other metals that it may contain. The remnants of this recovery can be used in railroad track ballast and as fertilizer. It has been used as a road base material and as a cheap and durable means of roughening sloping faces of seawalls to progressively arrest the movement of waves. Blocks of slag have been used in the construction of retaining walls and foundations.

What was once an unwanted by-product of the steel making process can now be recycled and used in the manufacture of high performance concretes. When iron ore is heated in a blast furnace the impurities or 'slag', which include large quantities of calcium and silica, become molten and are separated from the raw iron.

As the slag is channeled out of the furnace, thousands of gallons of water are poured over it. This rapid cooling, often from a temperature of around 2,600° C., is the start of the granulating process. This process causes several chemical reactions to take place within the material, and gives the slag its cementitious properties.

The water carries the slag in its slurry format to a large agitation tank from where it is pumped along a piping system into a number of gravel based filter beds. The filter beds then retain the slag granules while the water filters away and is returned to the system.

When the filtering process is complete, the remaining slag granules, which now give the appearance of coarse beach sand, can be scooped out of the filter bed and transferred to the grinding facility where they are ground into particles that are finer than Portland cement This previously unwanted recycled product is used in the manufacture of high performance concretes, especially those used in the construction of bridges and coastal features where its low permeability and greater resistance to chlorides and sulfates can help to reduce corrosive action and deterioration of the structure.

Concrete or cement is a common building, construction and paving material. Concrete can be used to make roads, building foundations, walkways, patios, pool decks, driveways, airport landing strips and loading docks. In addition, concrete can be used to make objects such as building blocks and pavers in a wide range of shapes such as rectangular, hexagonal, etc.

Due to the increasing environment concerns, however, there has been a upward demand on permeable paving materials, which provide water permeable properties as well as strength for use as paving materials. Permeable paving materials allow moisture to filter through and replenish underground water tables and other water sources. It also helps to drain water into the ground and relieve stress on over taxed storm water systems during high rain conditions.

In the past, permeable concrete has contributed to the LEED ("Green Building") rating system. Originally developed for the U.S. Department of Energy and standing for Leadership in Energy and Environmental Design, LEED is growing in use by design professionals in response to federal, state, and local government agencies, and by private developers. LEED uses a point rating system to recognize sustainable site and building design. Depending upon geographical location due to varying enabling legislation and practice in the different states, complying with the rating system is voluntary and it aims to improve environmental and economic performance of buildings and sites. Developed by consensus with the participation of many organizations, the rating system and certification program based on providing evidence of compliance to the rating system is administered by the U.S. Green Building Council. A complete description and downloads can be found on the Internet at www.usgbc.org/LEED.

Importantly, permeable concrete can earn points or "credits" in the LEED rating system. Credits are earned under several categories of use including stormwater management, local/regional materials, and exterior design to reduce heat islands. For stormwater management, Credit 6.1 (1 point) can be earned for building sites where the existing impervious area is greater than 50%. Permeable concrete can meet this requirement. In some urbanized areas with this extent of impervious cover, permeable concrete may be more cost-effective than separate water detention and/or retention facilities due to space and configuration constraints. The LEED requirement is that runoff rate and quantity be reduced by at least 25%. It would be advantageous to provide permeable concrete that is able to reduce runoff to zero for the most frequent storms.

Credit 6.2 provides 1 point for treatment systems designed to remove 80% of the average annual post development total suspended solids (TSS), and 40% of the average annual post development total phosphorus (TP). The ability of permeable concrete to reduce these pollutants is typically greater than these percentages according to references in the Interlocking Concrete Pavement Institute (ICPI)'s manual, Permeable Interlocking Concrete Pavements-Selection, Design, Construction, Maintenance. The ICPI manual references studies on infiltration trenches (similar to permeable pavement bases) and porous pavements with reductions in TSS as high as 95% and TP as much as 70%.

Another source of credit is designated as Credit 5 (1 to 2 points), local regional materials: specify a minimum of 20% of building materials that are manufactured regionally within a radius of 800 km (500 miles). An additional point is earned if 50% of the regionally manufactured materials are extracted, harvested or recovered within this same radius.

Yet another Credit is 7.1 (1 point), landscape and exterior design to reduce heat islands. An option for meeting this requirement is to use light colored/high albedo materials with a reflectance of at least 0.3 for 30% of the sites non-roof impervious surfaces, i.e., pavements. Permeable concrete can be produced in practically any color, so it can be tailored to register an albedo of at least 0.3.

Albedo is defined as the ratio of outbound or reflected solar radiation to inbound radiation. It is measured with a pyranometer. A pyranometer is a type of actinometer used to measure broadband solar irradiance on a planar surface and is a sensor that is designed to measure the solar radiation flux density in watts per square meter from a field of view of 180 degrees. The name pyranometer stems from Greek, "pyr" meaning "fire" and "ano" meaning "above" or "sky". A typical pyranometer does not require auxiliary power to operate. Long-term measurements should be done with two pyranometers rather than one to better understand and compare diurnal changes in the radiation flux of pavements.

U.S. Pat. No. 6,419,740, issued Jul. 16, 2002 to Kinari et al. teaches a water-permeable solid material which can be used as paving materials. U.S. Pat. No. 6,824,605, issue Nov. 30, 2004 to De Buen-Unna, et al. also teaches ecological permeable concretes with high compression, bending and abrasion resistance for paving purposes.

The American Concrete Institute defines a Supplementary Cementitious Material (SCM) as an "inorganic material such as fly ash, silica fume, metakaolin, or ground-granulated blast-furnace slag that reacts pozzolanically or hydraulically." A material that reacts with by-products of the Portland cement reaction to form additional binder material is a pozzolan. SCMs including fly ash and ground-granulated blast-furnace slag are often used to replace Portland cement. Other SCMs, such as silica fume and other high silica content materials, are used to enhance various properties of concrete.

FIG. 1 (prior art) is a representative flow diagram illustrating the production process of environmental friendly SCMs. Processes for producing SCMs include mineralization via aqueous precipitation are known. FIG. 1 shows one such process which utilizes carbon dioxide and other pollutants such as sulfur dioxide, fly ash, salt and other manufacturing process brines, waste water and sodium hydroxide to produce calcium carbonates, other green building materials and clean flue gas. Carbon dioxide from waste flue gas, such as that produced by typical energy plants which burn coal or other organic compounds, is converted into stable or metastable, solid calcium and magnesium carbonate and bicarbonate minerals, similar to those found in the skeletons of marine animals and plants. Typical mineralization via aqueous precipitation involves contacting flue gas from the power plant with natural waters found in abundance on Earth. Many of the crystallographic forms synthesized utilizing these processes make it possible to produce high reactive cements.

A carbon credit is a generic term for any tradable certificate or permit representing the right to emit one tonne of carbon or carbon dioxide equivalent ($tCO_2e$). Carbon credits and carbon markets are a component of national and international attempts to mitigate the growth in concentrations of greenhouse gases (GHGs). One carbon credit is equal to one ton of carbon dioxide, or in some markets, carbon dioxide equivalent gases. Carbon trading is an application of an emissions trading approach. Greenhouse gas emissions are capped and then markets are used to allocate the emissions among the group of regulated sources. The goal is to allow market mechanisms to drive industrial and commercial processes in the direction of low emissions or less carbon intensive approaches than those used when there is no cost to emitting carbon dioxide and other GHGs into the atmosphere. Since GHG mitigation projects generate credits, this approach can be used to finance carbon reduction schemes between trading partners and around the world.

A carbon offset is a reduction in emissions of carbon dioxide or greenhouse gases made in order to compensate for or to offset an emission made elsewhere. Carbon offsets are measured in metric tons of carbon dioxide-equivalent ($CO_2e$) and may represent six primary categories of greenhouse gases. One carbon offset represents the reduction of one metric ton of carbon dioxide or its equivalent in other greenhouse gases.

There are two markets for carbon offsets. In the larger, compliance market, companies, governments, or other entities buy carbon offsets in order to comply with caps on the total amount of carbon dioxide they are allowed to emit. This market exists in order to achieve compliance with obligations of Annex 1 Parties under the Kyoto Protocol, and of liable entities under the EU Emissions Trading Scheme. In 2006, about $5.5 billion of carbon offsets were purchased in the compliance market, representing about 1.6 billion metric tons of $CO_2e$ reductions. In the much smaller, voluntary market, individuals, companies, or governments purchase carbon offsets to mitigate their own greenhouse gas emissions from transportation, electricity use, and other sources. For example, an individual might purchase carbon offsets to compensate for the greenhouse gas emissions caused by personal air travel. Many companies offer carbon offsets as an up-sell during the sales process so that customers can mitigate the emissions related with their product or service purchase, such as offsetting emissions related to a vacation flight, car rental, hotel stay, consumer good, etc. In 2008, about $705 million of carbon offsets were purchased in the voluntary market, representing about 123.4 million metric tons of $CO_2e$ reductions. Offsets are typically achieved through financial support of projects that reduce the emission of greenhouse gases in the short- or long-term. The most common project type is renewable energy, such as wind farms, biomass energy, or hydroelectric dams. Others include energy efficiency projects, the destruction of industrial pollutants or agricultural byproducts, destruction of landfill methane, and forestry projects. Some of the most popular carbon offset projects from a corporate perspective are energy efficiency and wind turbine projects.

Screeds and Roller Tube Finishers (RTFs) are available both engine and hydraulic drive power. Typically, RTFs strike off concrete fast and accurately, quickly establishing an acceptable surface grade. RTFs are portable and powerful, perfect for quick-strike finishing of pavement, and in particular, pervious or permeable concrete. Various types of such RTFs are manufactured and sold by Allen Engineering. See: https://www.alleneng.com/rtf-epu; https://www.alleneng.com/rtf-hpu; https://www.alleneng.com/product/magic-screed/all.

ADVANTAGES AND SUMMARY OF THE INVENTION

The present invention is a pourable concrete that has good water permeability and sufficient strength for use as a paving material. It combines the advantages of permeable pavers and water-permeable concrete materials and provides an ideal paving material both for indoor and outdoor installations.

One advantage and object of the present invention is the ease of installation and removal. The only special tools needed for installing permeable pourable concrete are a vibrating compaction machine or "Vibra Plate" and jointing tools. The compaction machine is used to compact the concrete material and jointing tools are used to prepare expansion joints in the wet concrete to prevent cracking of the poured concrete pavement.

Another advantage and object of the present invention is to provide a pourable concrete paving material with compressive strengths of up to 3000+psi as per ASTM codes and standards.

Yet another advantage and object of the present invention is to provide environmentally-friendly building materials. Rain water and moisture can permeate and pass through the present invention and reach subterranean water tables. This helps replenish underground water sources and also solves drainage problems in urban as well as rural areas.

Another advantage and object of the present invention is to provide a paving material in compliance with LEED standards and guidelines. In the present case, the present invention is useful for preventing run-off of rain or storm water. As rainwater is absorbed, pollutants are also filtered and removed from the water, thus avoiding the need for storm water collection, retention and treatment facilities. The present invention is also useful for increasing reflectance of solar energy, thus preventing "heat islands" from developing which would alter the environmental impact of development. Due to the ready availability of the formula components and materials and ability to utilize existing equipment for manufacturing and installation, the permeable pourable concrete of the present invention can be made and distributed locally.

Yet another advantage and object of the present invention is to provide an aesthetically pleasing concrete. With a variety of forms, colors and installation options, designers and installers can easily create surfaces of different sizes, shapes, textures and appearances.

It is yet a further advantage of the present invention to incorporate Supplementary Cementitious Materials [hereafter SCMs] manufactured utilizing technology which reduces carbon emissions. Mineralization of calcium carbonates via aqueous precipitation can provide enhanced savings in terms of carbon credits and/or carbon offsets which offset the cost of recovery of these materials.

In an embodiment of the present invention, a permeable, pourable concrete formed into a predetermined dimension and shape optionally utilizing a vibrating compacting tool comprises (I) a base of about 3 parts by weight of blast-furnace slag and 1 part by weight of sand, (ii) between about one fifth and one half part by weight of ¼" gravel, (iii) between 15 and 21 parts by weight Portland cement, the permeable, pourable concrete having a water permeability in excess of 1 inch per hour and having an average compressive strength in excess of about 3000 psi.

In an embodiment of the present invention, 40% of the Portland cement in the permeable, pourable concrete is comprised of SCMs formed by mineralization of $CO_2$.

In an embodiment of the permeable, pourable concrete of the present invention, 30% of the Portland cement is comprised of SCMs formed by mineralization of $CO_2$.

In an embodiment of the permeable, pourable concrete of the present invention, the SCMs formed by mineralization of $CO_2$ comprise calcium carbonate recovered by aqueous precipitation.

An embodiment of the permeable, pourable concrete of the present invention further includes control joints located on an upper surface of the concrete to increase absorption.

An embodiment of the permeable, pourable concrete of the present invention further contains one or more color agents.

In an embodiment of the permeable, pourable concrete of the present invention, the blast-furnace slag is ground and/or granulated.

In an embodiment of the permeable, pourable concrete of the present invention, the blast-furnace slag is pre-processed through an industry standard 3/16" No. 4 sieve.

The present invention is a method for producing permeable, pourable concrete utilizing SCMs recovered from $CO_2$ flue gases, having a water permeability in excess of 1 inch per hour and having an average compressive strength in excess of about 8000 psi, the method comprising the steps of combining (i) a base of 3 parts by weight of blast-furnace slag and 1 part by weight of sand, (ii) between about one fifth and one half part by weight of ¼" gravel, and (iii) between 15 and 21 parts by weight Portland cement wherein up to 40% of the Portland cement comprises SCMs formed by mineralization of $CO_2$, adding water, mixing, pouring the wet concrete mixture into a predetermined size and shape form, and compacting the wet concrete using a compacting machine.

The present invention is also a method for producing permeable, pourable concrete utilizing SCMs recovered from $CO_2$ flue gases, having a water permeability in excess of 1 inch per hour and having an average compressive strength in excess of about 8000 psi, the method comprising the following steps: A. Combining (i) a base of 3 parts by weight of blast-furnace slag and 1 part by weight of sand, (ii) between about one fifth and one half part by weight of ¼" gravel, and (iii) between 15 and 21 parts by weight Portland cement; B. Adding water; C. Mixing the raw ingredients and water together to form a wet mixture; D. Pouring the wet concrete mixture into a predetermined size and shape form; E. Compacting the wet concrete using a compacting machine; and F. Curing the concrete.

An embodiment of the method for producing permeable, pourable concrete comprises the step of deairing the wet concrete before it cures;

The present invention is also a permeable, pourable concrete formed into a predetermined size and shape utilizing a hydraulic-type compacting block forming machine, the permeable, pourable concrete comprising (I) a base of 4 parts by weight of blast-furnace slag and 1 part by weight of sand, (ii) between about one fifth and one half part by weight of ¼" gravel, (iii) between 15 and 25 parts by weight Portland cement wherein between about 5 and 7 parts by weight of the Portland cement are SCMs containing calcium carbonate formed by mineralization of $CO_2$, the paver having a water permeability in excess of 1 inch per hour and having an average compressive strength in excess of about 8000 psi.

The present invention is also a method for reducing carbon emissions and producing a permeable, pourable concrete having a water permeability in excess of 1 inch per hour and having an average compressive strength in excess of about 3000 psi, the method comprising the following steps: A. Forming SCMs comprising calcium carbonate recovered by mineralization of $CO_2$; B. Combining (i) a base of 3 parts by weight of blast-furnace slag and 1 part by weight of sand, (ii) between about one fifth and one half part by weight of ¼" gravel, and (iii) between 15 and 21 parts by weight Portland cement wherein up to 40% of the Portland cement comprises SCMs comprising calcium carbonate recovered by mineralization of $CO_2$; C. Mixing the concrete with water to form a wet, pourable mixture; D. Pouring the wet concrete into a predetermined size and shape; and E. Compacting the wet concrete utilizing a concrete compacting machine.

In another embodiment of the method for reducing carbon emissions described above, the calcium carbonate is recovered by mineralization of $CO_2$ via aqueous precipitation.

The present invention is also a permeable, pourable concrete having a permeability of water in excess of 1 inch per hour and a compressive strength of at least about 3000 pounds per square inch, wherein the concrete is formulated with about 20-22% by weight cement, about 10-11% by weight sand, about 23-24% by weight gravel, about 44-45% by weight granulated blast slag, and water, and wherein the water to cement ratio is about 0.037.

Further details, objects and advantages of the present invention will become apparent through the following descriptions, and will be included and incorporated herein.

DETAILED DESCRIPTION OF THE PREFERRED EMBODIMENT

Figure 1:
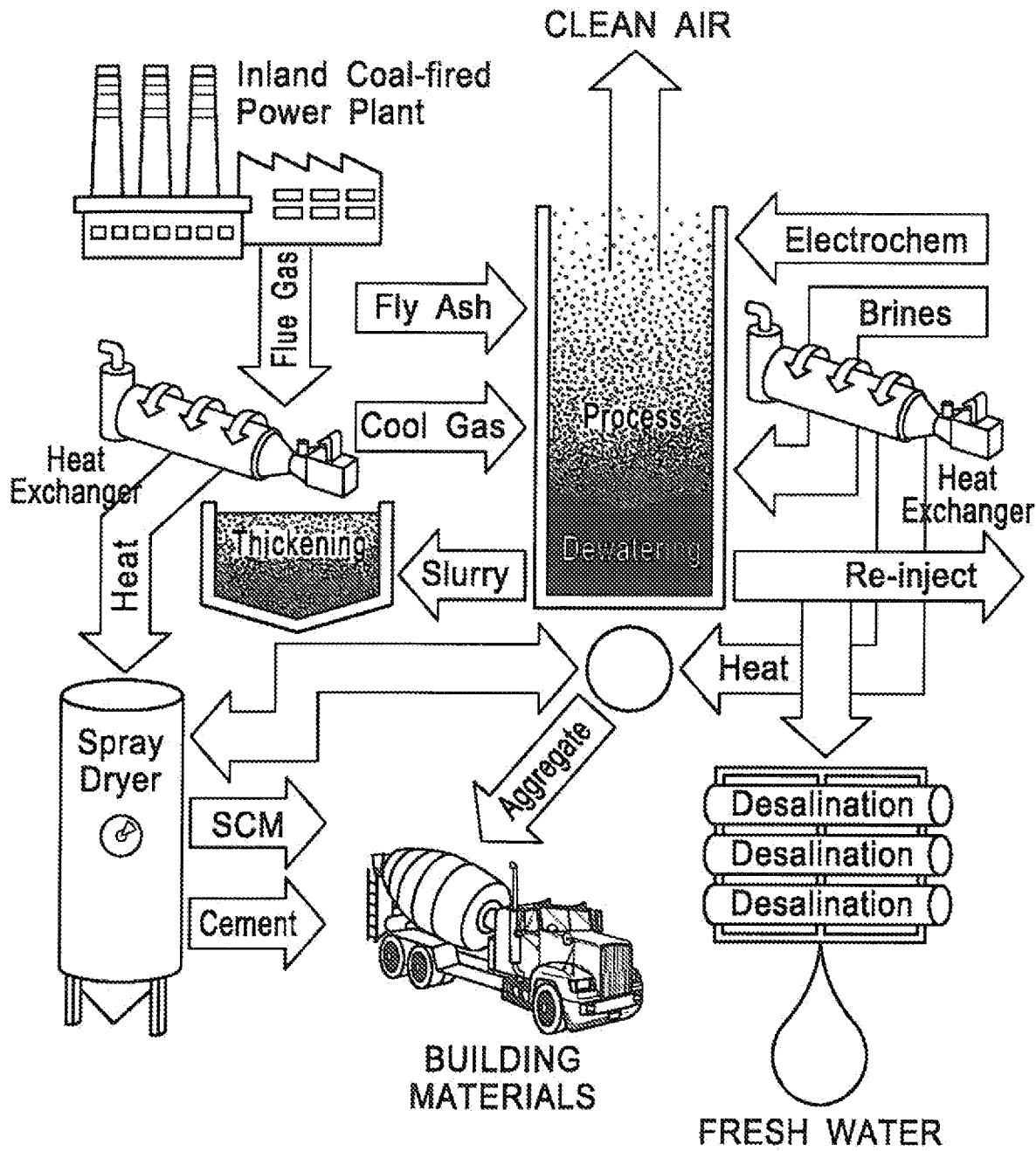
FIG. 1 (prior art) is a representative flow diagram illustrating the production process of environmental friendly SCMs.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

TABLE 1

Mix Design for Permeable, Pourable Concrete 100

Result

Batch and time: 110314 - 1/1: Jan. 29, 2019 1:38:03 PM
Project:
Mould:
Info: Approved
Recipe: 105: Tan\B5/B3/B7 B4\B11 Hydro/flo
Last changed: Jan. 29, 2019 7:42:08 AM
Destination: Station 3

| Material No. Name | Type | SSD Density (kg/m³) | Rec. (kg) | Res. (kg) | Rev. (kg) | Moist. (%) | water (kg) | Pounds |
| --- | --- | --- | --- | --- | --- | --- | --- | --- |
| 4 Granite Stone | Gravel | 2707 | 277.65 | 274.59 | −1.1 | 3.3 | 9.37 | 604.09 |
| 3 Slag | Sand | 2500 | 494.24 | 511.78 | 3.5 | 0.0 | 0.0 | 1125.91 |
| 2 Granite Sand | Sand | 2662 | 121.47 | 121.04 | −0.4 | 2.5 | 3.10 | 266.28 |
| 10 Cement Grey | Cement | 3150 | 252.00 | 251.94 | −0.0 | 0.0 | 0.00 | 554.26 |
| 40 Prewater | Water | 1000 | 0.00 | 0.00 | 0.00 | 100.0 | 0.00 | |
| 22 Yellow color | Color powder | 1000 | 4.46 | 4.48 | 0.4 | 0.0 | 0.0 | 9.85 |
| 23 Red color | Color powder | 1400 | 1.55 | 1.59 | 2.5 | 0.0 | 0.0 | 3.49 |
| 41 Colorwater | Water | 1000 | 5.25 | 5.23 | −0.3 | 100.00 | 5.23 | |
| 100 Finewater | Finewater | 1000 | 88.28 | 27.33 | −54.9 | 0.0 | 27.33 | |

Water in materials by moisture variation 12.47    No Add Mix
Total (kg) 1245 1210 −2.8
Total (litre) 525 482
Air content: 0.0 Litre
Mix time: 1:20 m:s
Moisture method: Meas. Moist. Dose water

| | Order | Result | Dev. | +Total | −Total |
| --- | --- | --- | --- | --- | --- |
| Effective water (L) | 93.53 | 45.04 | −48.04 | 1.05 | 1.05 |
| Moist. % weight | 9.72 | 10.09 | 0.36 | 0.08 | 0.08 |
| Moist. % vol. | 23.06 | 25.32 | 2.26 | 0.20 | 0.20 |
| W/C - ratio | 0.37 | 0.18 | −0.192 | 0.004 | 0.004 |
| Free Waterdosage | 0.00 | 0.00 | 0.00 | 0.00 | 0.00 |

The following table shows an optimum formula for the permeable, pourable concrete 100 of the present invention.

TABLE 2

Optimum Mix Formula for Permeable, Pourable Concrete 100
Hydro-Flo Poured Concrete

| Ingredient | Lbs. | % |
| --- | --- | --- |
| Cement | 554.26 | 21.73 |
| Sand | 266.28 | 10.44 |
| Gravel | 604.09 | 23.68 |
| Granulated Blast Slag | 1125.91 | 44.14 |
| Total | 2550.54 | 99.99 |
| W/C Ratio | | 0.037 |

Applicants point out the vast difference between permeable poured concrete and the paving stones described in the related patents. An embodiment of the permeable poured concrete of the present invention has a water ratio of between 15.25 gallons of water per yard of mix to 25 gallons of water per yard of mix. The paving stones have much less water, i.e., a maximum of approximately 8 gallons of water per mix. A preferred embodiment of the permeable poured concrete mix of the present invention cannot be used in a paving stone machine due to the facts that the water content is way too high and the pourable, permeable concrete product of the present invention would never properly sit or set in the mold.

The permeability of the pourable, permeable concrete after setting and curing is about 100 inches of water per hour.

The following materials may be used and are presented here as examples only. Slag: Granulated Blast-Furnace Slag (GBFS), which has been sieved to remove particles larger than 3/16" with sieve size #4; 1/4" Gravel: Crystalline Silica (Aggregate); and Cement: Permanent Type 1-2-3-5; and white cement.

Supplementing the formulae or process for manufacturing the permeable, pourable concrete of the present invention can provide control over permeability. It will be understood that while materials including addmix and fly ash are commonly used with concrete objects, their use in the permeable, pourable concrete of the present invention will provide the manufacturers with a tool for limiting or decreasing permeability, in the event of, for example, a level, uniform, maximum 1" per hour rate of water permeation is desired. It will be understood, however, that there will be a limiting factor on the permeability of permeable, pourable concrete 100 of the present invention through use of these materials.

Thus, the permeable, pourable concrete 100 of the present invention is composed of (i) a base of 3 parts by weight of slag and 1 part by weight of sand, (ii) between about 20% and about 50% by weight of gravel, and (iii) between about 15% and about 21% Portland-type or equivalent cement. These formulations are best suited for preparation of the permeable, pourable concrete 100 of the present invention having break strength of minimum 3000 psi. Moreover, permeability of the present pourable concrete 100 is greater than 100" per hour, and the LEED standard requires at least 1" per hour permeability. To determine the entire volume of water flow through the permeable, pourable concrete 100 of the present invention, the area of the test sample of permeable, pourable concrete 100 can be used to determine the overall volumetric flow through the material.

An optional embodiment of the permeable, pourable concrete 100 of the present invention is composed of (I) about 10.44% by weight of sand, (ii) about 23.68% by weight of gravel, (iii) about 44.14% granulated blast slag and (iv) about 21.73% Portland-type or equivalent cement. A water-cement ratio of 0.037 can be used. These formulations are best suited for preparation of the permeable, pourable concrete 100 of the present invention having break strength of minimum 3000 psi. Moreover, permeability of the present pourable concrete 100 is greater than 100" per hour, and the LEED standard requires at least 1" per hour permeability. To determine the entire volume of water flow through the permeable, pourable concrete 100 of the present invention, the area of the test sample of permeable, pourable concrete 100 can be used to determine the overall volumetric flow through the material.

In one alternative embodiment, calcium carbonate precipitate powder such as that manufactured by Calera Corporation at their Moss Landing, California facility, is used to replace part of the Portland-type or equivalent cement in previous formulae of the permeable, pourable concrete 100. In one embodiment, precipitate powder manufactured utilizing a mineralization via aqueous precipitation process can replace 10%-40% by weight of the Portland type or equivalent cement in the formulae of the permeable, pourable concrete 100. In one embodiment, approximately 30% by weight SCM in the form of precipitate powder strikes a balance between functionality in terms of permeability and strength of the permeable, pourable concrete 100 and the environmental benefits of carbon reduction. Utilizing SCMs produced by mineralization via aqueous precipitation is able to reduce carbon emissions from $CO_2$-producing processes.

Detailed information for calcium carbonate precipitate powder such as found in the typical Material Safety Data Sheet follows:
Product name: Precipitate powder
Composition/Information on Ingredients:
Estimated Composition:
   Sodium Salts >20%
   Magnesium/Calcium hydroxide >5%
   CalciumiSodium/Magnesium carbonates >5%
   Water <1%
Hazards Identification:
   Appearance: White powder
   Effects of Acute Exposure:
   Eyes: Can irritate eyes
   Skin: Can dry and irritate skin
   Inhalation: Can cause coughing and respiratory tract irritation in dry form
   Ingestion: Possible but unlikely to occur in large quantities
   Carcinogenicity: No information found
   Medical conditions aggravated: May aggravate any pre-existing chronic respiratory disease in dry form
First-Aid Measures:
   Eye contact: Flush eyes with copious amounts of water for at least 15 mm. Assure adequate flushing of eyes by separating eyelids with fingers. Obtain medical attention.
   Skin contact: Flush skin with copious amounts of water for at least 15 mm, while removing contaminated clothing and shoes, 'Nash contaminated clothing before reuse. Call physician if irritation develops.
   Inhalation: Remove to fresh air. If breathing is difficult, give oxygen and seek medical attention.

Ingestion: If swallowed, wash out mouth with water, provided person is conscious. Do not induce vomiting. Obtain medical attention immediately.

Firefighting Measures:
  Stability: Product is considered stable.
  Flash point and method: Non flammable.
  Extinguishing media: Use appropriate media to control primary source of fire. Otherwise, use dry chemical, carbon dioxide, water spray or foam.
  Hazardous combustion products: Decomposition products are unknown and are not suspected.
  Firefighting instructions: No special procedures:

Accidental Release Measures:
  Spill/leak procedures: Vacuum powder and wet sweep to avoid dust dispersal. Rinse area with water.
  Personal precautions: Use personal protective equipment: gloves, safety glasses, and protective clothing
  Environmental precautions: No ecological problems are to be expected Handling and Storage:
  Safe handling advice: Use personal protective equipment as described in Accidental Release Measures section. Always wash hands after handling the product and before eating or drinking.
  Storage conditions: Store in a cool, dry place in a tightly closed container.
  Incompatible products: Unknown Exposure Control/Personal Protection:
Personal Protective Equipment:
  Respiratory protection: Use NIOSH/MSHA approved respirators if ventilation is not adequate.
  Hand protection: Gloves
  Eye protection: Safety glasses
  Skin and body protection: Long-sleeve protective clothing
  Specific hygiene measures: Wash hands after working with substance. Change contaminated clothing.

Physical and Chemical Properties:
  Molecular weight: Mixture
  Physical state: Powder
  Form and color: Whitish
  Odor: None
  pH: 8.0-11.0
  Boiling point/range: No data available
  Melting point/range: Not applicable to liquid. No data for solid.
  Decomposition temperature: No data available
  Flashpoint: Not flammable.
  Autoignition temperature: Not flammable
  Flammability limits: No data available.
  Freeze point: No data available
  Vapor pressure: No data available
  Vapor density: No data available
  Density (bulk): No data available
  Solubility in water: No data available Stability and Reactivity
  Conditions to avoid: Keep bottle closed until use
  Materials to avoid: Unknown
  Hazardous decomposition products: Decomposition products are unknown and are not suspected Toxicological Information:
Effects of Acute Exposure:
  Skin: Can cause irritation or rash on contact with abraded skin
  Eyes: Can cause irritation
  Nose: Inhalation of dust can cause nose, throat, and respiratory tract irritation and coughing Ecological Information:
  No data available.

Disposal Considerations:
  The material can be disposed in a permitted landfill in accordance with applicable federal, state, and local rules.

Transportation Information:
  Not regulated.

Regulatory Information:
  Not regulated.

A typical cement that can be used in the formulation and mixing of the permeable, pourable concrete 100 of the present invention is manufactured by Lehigh Portland Cement Company under product name ALLCEM CEMENT. A Material Safety Data Sheet describes the components of the cement as having about 30-45% hydrated amorphous silica, about 30-45% calcium compounds, about 8-15% magnesium compounds, about 5-15% aluminum compounds, about 0-4% sulfur, about 0-1% of the following: iron, titanium, manganese and potassium compounds, and about 0-0.2% crystalline silica. Other Portland-type cement manufacturers and types will be known to those skilled in the art.

Blast-furnace slags are well known. Ground granulated blast-furnace slag or equivalent can be used in the present invention.

The permeable concrete 100 of the present invention can be manufactured incorporating up to 40% by weight SCM recovered from $CO_2$ waste flue gas or other sources of waste $CO_2$ through a process of mineralization of the $CO_2$ via aqueous precipitation. In an alternate embodiment, the permeable paver comprises 30% SCMs formed by mineralization via aqueous precipitation. Utilization of waste $CO_2$ to produce SCMs by mineralization via aqueous precipitation will result in a permeable concrete 100 which enables greater compliance with LEED standards. As discussed, such permeable concrete 100 will not only reduce runoff of rain water but result in reduction of carbon emissions by utilizing the $CO_2$ commonly found in waste flue gases to produce the SCMs used in the present invention.

Thus, the permeable concrete 100 of the present invention can essentially help lower greenhouse emissions and emissions of $CO_2$ by using SCM products formed using waste $CO_2$.

Concrete Retarders

Premature setting of concrete can have some disastrous effects on profits and job timetables. Flash set might take place with a hot mix on a warm, windy day. Floor slabs can set up before finishing is completed, thereby necessitating expensive, time-consuming resurfacing or grinding. Deep beams might harden in layers causing undesirable cold joints. Casting deck slabs for continuous or composite bridges can result in cracking if the concrete hardens while the girders are deflecting form the weight of green concrete being placed elsewhere on the deck. Contractors must delay the set around decorative aggregates to obtain maximum reveal and the best possible color. The list is long-there are many cases when a speedy set can mean a delayed or inferior job.

The common way to slow the hardening of the permeable, pourable concrete 100 of the present invention is to employ an admixture termed a retarder. Unfortunately, there exists some confusion regarding the correct application of retarders and water reducing agents. Retarders are intended for use only in hot weather; water reducing agents should be added during normal temperatures. Water reducing agents reduce the water-cement ratio, resulting in higher strengths. Retarders are primarily intended to counteract the harmful results of heat on the permeable, pourable concrete 100 mix; they lower the water/cement ratio only as a side effect. Use of concrete retarder in cold weather is not recommended. Naturally, all other things being equal, the more retarder that is added to the permeable, pourable concrete 100 mix of the present invention, the greater will be the delay of the set. Contractors can simplify matters by attempting to keep job conditions as uniform as possible. They should be ready to accept ready mix as soon as it is delivered to avoid build-up of heat. Shade the permeable, pourable concrete 100 of the present invention from the sun's direct rays. On hot, dry, windy days erect windbreaks around slabwork. By keeping job conditions comparatively constant, setting time can usually be controlled. See: https://www.concreteconstruction.net/how-to/materials/retarders-for-concrete_o The present invention comprises use of a retarder to slow the curing of the pourable, permeable concrete. Us of the retarder to give the installer more time so the pourable, permeable concrete of the present invention does not flash. Embodiments of the present invention contain between about 0.1% to about 1.0% by weight of retarder.

Preparation Steps

Figure 2:
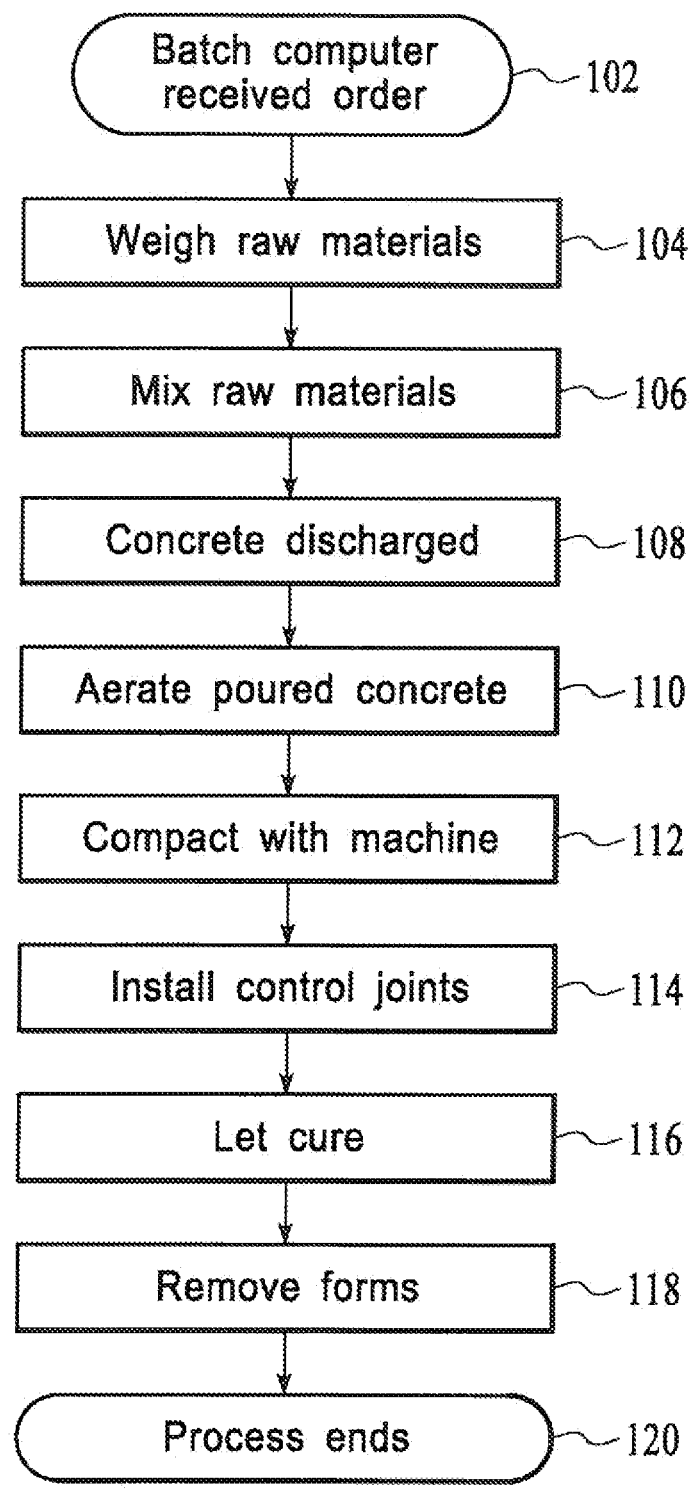
FIG. 2 is a flowchart showing the steps of manufacturing permeable, pourable concrete 100 of the present invention.

FIG. 2 is a flowchart showing the steps of manufacturing permeable, pourable concrete 100 of the present invention. In Step 102, the process starts off as the Batch Computer receives an order to make a load of permeable, pourable concrete 100. In Step 104, raw materials that consist of blast slag, sand, gravel, optionally a color agent, cement and water are pre weighed according to the order quantity, desired physical properties and shapes of permeable, pourable concrete 100.

In Step 106, when all raw materials are weighed and ready, blast slag, sand and gravel will be poured into the mixer, followed by cement, optionally a color agent, and water. The mixing time is approximately 3 minutes. Water is added to attain desirable consistency of the entire mixture and the amount of water used depends upon humidity during the mixing process. Coloring and pigmentation is added as desired.

In Step 108, the mixture in the mixer is discharged into a prepared concrete form. It will be understood by those skilled in the art that typical forms are made from wooden boards, plastic tubes, fiberglass sections, or other rigid material having a sufficient strength and rigidity to support the weight of the permeable, pourable concrete 100 until it hardens or cures into a rigid, cast material.

In optional Step 110, the permeable, pourable concrete 100 is aerated using an aeration wand or other vibrating tool. In general, unless concrete is properly consolidated, voids reduce concrete strength regardless of the water-cement ratio. Consolidating the freshly poured, fluid concrete, usually by vibration, increases concrete strength by driving out entrapped air. It also improves bond strength and decreases concrete permeability. Deaeration of the permeable, pourable concrete 100 is typically a two-part process. A vibrator creates pressure waves that separate aggregate particles, reducing friction between them. Almost simultaneously, a second stage starts to occur as entrapped air bubbles rise to the surface. This deaeration process continues after the permeable, pourable concrete 100 has flattened out. Until both vibration stages are complete, the permeable, pourable concrete 100 of the present invention isn't fully consolidated.

In optional Step 112, the permeable, pourable concrete 100 of the present invention can be compacted with a vibrating plate-type compactor.

Vibratory Compactors

To be able to select the right type of equipment needed, it is important to understand the different types of finishing and compaction:
1. Static compaction—achieved by applying a heavy load on concrete (i.e. static trench roller tube finisher, electronic screeds for strike-off of concrete after pour)
2. Dynamic compaction—achieved by using a combination of vibrations and load It is important to note that once type of compactor does not cover all applications. Although modern concrete compactors can be somewhat adaptable to a variety of applications, there are specific types and models designed to meet different compaction needs.

There are two principles of Dynamic Compaction, i.e., Ramming and Vibrating. Impact ramming or tamping means that the weight of a machine repeatedly hits the surface of the concrete at a certain speed and utilizes its motive force to compact the concrete. The achieved compaction degree depends on the weight of the moving mass and at the speed at which it hits the concrete. This process is done with a rammer and is used in both construction and hardscape/landscape sectors. A rammer uses a high-impact force and is best for working with moist cohesive concrete to create firm concrete slabs, pavers, foundations and other permanent structures. Rammers are typically used in confined areas such as trenches, but a rammer is also good for compacting patch repairs to roads, footings, building foundations and is indispensable when it comes to highway construction and general flatwork.

Vibrating machines have forward plates and reversible plates. Vibrating means that the bottom plate of the vibrating compactor is set in vibration by one or two eccentric shafts in the exciter attached to it. Due to the vibrations, the friction between the particles is reduced and the particles are relocated; therefore, increasing concrete density. Plate compactors are available in both forward and reverse travel modes and are better suited for larger areas or jobsites where the permeable, pourable concrete 100 of the present invention is used. Small forward plates are ideal for compacting no/slump permeable, pourable concrete 100 of the present invention. Larger plates cover more sizable areas of the permeable, pourable concrete 100 of the present invention in a short time and the rounded base plate ensures a smooth finish. Reversible compactors allow both forward and reverse travel. Characterized by advanced technology, reliability and durability, these machines offer an excellent price-to-performance ratio. With these machines there is no need to turn the machine around. Maneuverability is enhanced. Smaller reversible compactors are available with wheel kits, extension plates and polyurethane pads making these machines ideal for a variety of hardscape/landscape applications using the permeable, pourable concrete 100 of the present invention.

Control Joints

As shown best in Step 114, control joints can be added to the permeable, pourable concrete if desired. Control joints are planned cracks which allow and/or compensate for movements caused by temperature changes and drying shrinkage. If the concrete does crack, it is important to have an active role in deciding where it will crack and that it will crack in a straight line instead of randomly. Space joints are typically set (in feet) no more than 2-3 times the slab thickness (in inches). In other words, a 4" slab should have joints 8-12 feet apart. Cut joints must be deep enough, typically about 25% of the depth of the slab. As an example, a 4" thick slab should have joints 1" deep. Grooving tools can be used to cut joints in fresh concrete. If using a saw, joints can be cut as soon as the concrete is hard enough that (1) the concrete isn't deformed by the weight of the saw and/or operator and (2) the edges abutting the cut don't chip from the saw blade. In hot weather, concrete might crack if joints are not cut within 6-12 hours after finishing concrete. In this situation, if one doesn't want to use a grooving tool to cut joints, there are early-entry dry-cut lightweight saws that can be used almost immediately after finishing. These saws cut 1" to 3" deep, depending on the model. Control joints can be placed under walls or under carpet areas. Under walls they won't be seen. Under carpet areas the joints won't have a chance to telegraph through vinyl areas. It is also important to avoid re-entrant corners. Planning the joint pattern can sometimes eliminate re-entrant corners. It will be understood that most construction plans don't have joint spacing marked on them, so this important part of concrete construction should not be left to chance.

Curing

In Step 116, the permeable, pourable concrete 100 of the present invention is allowed to cure or dry. It will be understood that as with other concrete formulations used in the prior art, watering the upper surface of the concrete is often recommended. As with the permeable, pourable concrete 100 of the present invention, keeping the concrete 100 moist helps the curing process. In general, concrete hardens as a result of a chemical reaction, called hydration, between cement and water, not because it dries. Thus, the hardening, or curing, of the permeable, pourable concrete 100 of the present invention continues as long as moisture remains in the concrete.

In Step 118, the wooden, plastic or cardboard forms are removed and the free-standing, cured permeable, pourable concrete 100 should be ready to use. It will be understood that depending upon the mix of concrete 100 used, and the application, complete curing can sometimes take several days or weeks. However, often Step 118 can be performed prior to complete curing. In general, as long as the concrete 100 won't slump or deform, the board or other forms can be removed, cleaned, and recycled for the next job.

In Step 120, the process ends. It will be understood that additional steps are optional, and include but are not limited to sandblasting or chemically etching the surface of the permeable concrete 100 to give it a honed or other desired appearance, polishing the surface of the concrete 100, staining the surface, sides or other portions of the concrete 100, etc.

Experimental Test Results

Compressive Strength

Table 3 shows the results of hardness testing of the permeable, pourable concrete 100 of the present invention done in accordance with ASTM C 109. As shown, compressive strength of the permeable, pourable concrete 100 of the present invention was measured at intervals of 3 days, 14 days and 28 days, by which time the concrete 100 was presumed to be at or near its maximum compressive strength.

The actual compressive strength test results obtained are shown in the following table:

TABLE 3

Compressive Strength Experimental Data-
Permeable, Pourable Concrete 100
Compressive Strength Test Results

| Number of Days | psi |
|---|---|
| 3 | 846 |
| 14 | 2668 |
| 28 | >3000 |

Experimental test results of water flow rate through the permeable, pourable concrete 100 of the present invention.

Test Set Up:

Permeable, pourable concrete 100 of the present invention are installed on a bed of sand/gravels, emulating the actual application. Edges of permeable, pourable concrete 100 are water sealed to each other and to the perimeter with silicon or other elastomeric and sealing material to ensure moisture is flowing through the pourable concrete 100 itself, and not around or through holes/gaps between them. A water collection tank of the exact same dimensions is placed directly underneath the permeable concrete 100. Water is poured on top of the permeable concrete 100 continuously. Water starts to flow through the permeable concrete 100 and is collected in the water collection tank. The total depth of water collected was then measured periodically over time, from 0 minutes to 180 minutes at a period of 10 minutes. The differences between consecutive measurements is equivalent to the amount of flow over the respective 10-minute period. The flow per hour during any given 10-minute period is then known. IT will be understood that by deleting a statistically few test data points due to their apparent error or otherwise unusual deviation from average, smoother data curves can be obtained. Other techniques for calculating and graphing smoothed averages will be known by those skilled in the art.

A standard test for permeability of concrete is ASTM C1701/C1701M-17a entitled "Standard Test Method for Infiltration Rate of In Place Pervious Concrete". This test method covers the determination of the field water infiltration rate of in place pervious concrete.

The significance and use of the test are as follows:

Tests performed at the same location across a span of years may be used to detect a reduction of infiltration rate of the pervious concrete, thereby identifying the need for remediation.

The infiltration rate obtained by this method is valid only for the localized area of the pavement where the test is conducted. To determine the infiltration rate of the entire pervious pavement multiple locations must be tested and the results averaged.

The field infiltration rate is typically established by the design engineer of record and is a function of the design precipitation event.

This test method does not measure the influence on in-place infiltration rate due to sealing of voids near the bottom of the pervious concrete slab. Visual inspection of concrete cores is the best approach for determining sealing of voids near the bottom of the pervious concrete slab. See: https://www.astm.org/Standards/C1701.htm According to ASTM international standards, if the permeable, pourable concrete 100 of the present invention is to be exposed to freezing and deicing materials during service, the manufacturer shall satisfy the purchaser either by proven field performance or a laboratory freezing-and-thawing test that the permeable, pourable concrete 100 has adequate resistance to freezing and thawing. If a laboratory test is used, test in accordance with Test Method C 1645. Specimens sampled from batches of mix that will not be exposed to deicing salts in service shall be tested in tap water. Specimens sampled from batches of mix that will be exposed to deicing materials in service shall be tested in 3% saline solution. Specimens shall comply with either of the following: (a) no greater mass loss than 200 g/m$^2$ when subject to 25 freeze-thaw cycles, or (b) no greater mass loss than 500 g/m$^2$ when subject to 50 freeze-thaw cycles. This test method shall be conducted not more than 12 months prior to delivery of units.

Sampling and Testing. The purchaser or its authorized representative shall be accorded proper facilities to inspect and sample the permeable, pourable concrete 100 of the present invention at the place of manufacture from the wet concrete ready for delivery. Prior to delivery of permeable, pourable concrete 100 of the present invention, the supplier and purchaser shall decide on the lot size from which to sample test specimens for resistance to freezing and thawing, abrasion resistance, absorption, compressive strength, and dimensional tolerances. Sample a minimum of three (3) test specimens each for compressive strength, absorption, and dimensional tolerances and test units in accordance with Test Methods C 140. Specimens tested for dimensional tolerances may be used for absorption testing. Sample a minimum of three (3) specimens and test for resistance to freezing and thawing in accordance with Test Method C 1645. Sample a minimum of two (2) specimens for abrasion resistance and test in accordance with Test Method C 418.

The following describe three (3) different experimental tests conducted by Earth Systems, 500 Park Center Drive, #1, Hollister, CA 95023, www.earthsystems.com.

Project: Pacific Interlock Paving
Rev. Date: Sep. 9, 2019
Project No.: 302043-001
Time: 8:00 AM
Tested By: Deborah White
Location of Concrete Represented: ESP Lab
Doc. No.: 1909-009.LAB Density and Void Content of Freshly Mixed Pervious Concrete ASTM C1688-14
Volume of the Unit Weight Measure: 0.25 ft$^3$
Unit Weight of the Concrete: 128 lb/ft$^3$
Theoretical Density: 154.2 lb/ft$^3$
Void Content: 17.0%
Procedure Followed (A or B): A Potential Resistance to Degradation of Pervious Concrete by Impact and Abrasion ASTM C1747-13
Max. and Min. Curing Temperature 75.3/72.3° F.
Number of Compaction Blows: 17
Original mass of Specimens: 5264.7 gm
Final mass of Specimens: 21.2 gm
Percentage of Mass Loss of Specimens (1%): 100%

Density and Void Content of Hardened Pervious Concrete ASTM C1754-12
Origin of Specimen: Landset Engineers
Average Diameter (0.01 in.): 3.99 in
Length of Specimen (0.01 in.): 8.07 in
Method Used For Drying: Oven
Density (0.1/lb./ft.: 117.3 lb/ft$^3$
Void Content (0.1%): 20.0%
Age of Specimen: 29 Days
Deviations From Test Method: None Infiltration Rate of In Place Pervious Concrete ASTM C1701-09
Test Location: Don Chapin Quarry
Age and Thickness of Concrete: 29 days/5.5 in
Time Elapsed During Prewetting(s): 50 s
Weight of Infiltrated Water (lbs): 8 lb
Inside Diameter of Infiltration Ring (in.): 12 in
Time Elapsed During Infiltration Test(s): 73 s
Infiltration Rate (in./h): 96.6 in/hr
Number of Tests Performed: 1

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

We claim:

1. A method for producing a permeable concrete utilizing supplemental cementitious materials (SCMs) recovered from $CO_2$ flue gases, having a water permeability in excess of 95-100 inches per hour and having an average compressive strength in excess of about 3000 psi, the method comprising the following steps;

Combining (i) a base of 3 parts by weight of blast-furnace slag and 1 part by weight of sand, (ii) between about one fifth and one half parts by weight of ¼" gravel, and (iii) between 15 and 21 parts by weight Portland-type or equivalent cement wherein up to 40% of the Portland-type or equivalent cement comprises SCMs formed by mineralization of $CO_2$;

Forming a concrete mix using a water ratio of between 15.25 gallons of water per yard of mixed concrete to 25 gallons of water per yard of mixed concrete;

Pouring the mixed concrete into a predetermined form; and

Setting the concrete for a sufficient period of time in order to achieve the compressive strength.

2. A method for reducing carbon emissions and producing a permeable concrete having a water permeability in excess of about 95-100 inches per hour and having an average compressive strength in excess of about 3000 psi, the method comprising the following steps:

A. Forming supplemental cementitious materials (SCMs) comprising calcium carbonate recovered by mineralization of $CO_2$;

B. Combining (i) a base of 3 parts by weight of blast-furnace slag and 1 part by weight of sand, (ii) between about one fifth and one half part by weight of ¼" gravel, and (iii) between 15 and 21 parts by weight Portland-type or equivalent cement wherein up to 40% of the Portland-type or equivalent cement comprises SCMs comprising calcium carbonate recovered by mineralization of $CO_2$;

C. Forming a concrete mix using a water ratio of between 15.25 gallons of water per yard of mixed concrete to 25 gallons of water per yard of mixed concrete;

D. Pouring the mixed concrete into a predetermined form; and

E. Setting the concrete for a sufficient period of time in order to achieve the compressive strength.

3. The method of claim 2 in which the calcium carbonate is recovered by mineralization of $CO_2$ via aqueous precipitation.

* * * * *